United States Patent [19]
Orr et al.

[11] 3,764,184
[45] Oct. 9, 1973

[54] SHOCK MOUNTED TRACK CARRIER ROLLER

[75] Inventors: Bobby J. Orr, Springfield; Bill A. Danner, Rochester; Roby A. Parks, Springfield, all of Ill.

[73] Assignee: Allis-Chalmers Corporation, Milwaukee, Wis.

[22] Filed: May 2, 1972

[21] Appl. No.: 249,541

[52] U.S. Cl. .................................................. 305/25
[51] Int. Cl. .............................................. B62d 55/16
[58] Field of Search ................................. 305/27, 25

[56] References Cited
UNITED STATES PATENTS
1,514,187   11/1924   Wickersham ......................... 305/25
3,695,737   10/1972   Alexander ............................. 305/27
2,361,800   10/1944   Thompson ......................... 305/25 X

*Primary Examiner*—Richard J. Johnson
*Attorney*—Charles L. Schwab et al.

[57] ABSTRACT

The carrier roller assembly for a track of an endless track vehicle is supported on a track frame by a pair of elastomer pads to absorb shock load, reduce noise and provide movement to keep mud from packing around the roller. A releasable pre-load bar holds the carrier roller assembly on the track frame with the elastomer pads in a preloaded condition and has a lost motion relationship with the carrier roller assembly permitting downward cushioned movement of the latter during operation of the vehicle.

4 Claims, 2 Drawing Figures

PATENTED OCT 9 1973  3,764,184

SHOCK MOUNTED TRACK CARRIER ROLLER

BACKGROUND OF THE INVENTION

Heretofore others have provided resilient mounting for track carrier rollers, some of which incorporate coil springs, others of which incorporate leaf springs. These prior art constructions have not proven entirely satisfactory from the standpoint of function, cost, space requirements and service life.

BREIF DESCRIPTION OF THE INVENTION

A track carrier roller assembly is carried on the track frame of a crawler tractor by a pair of elastomer pads which resist shock and vibration loading in shear and compression. The cushioned carrier roller assembly reduces impact loading on the bearings of the rollers, reduces shock to the track frame and also reduces noise. Also, the movement of the track carrier roller during operation prevents a buildup of mud around the roller, which in some prior art constructions caused the roller to stop rotating, thus resulting in abrasive wear of the track and the roller.

BRIEF DESCRIPTION OF THE DRAWINGS

The invention is illustrated in a sheet of drawings in which.

DETAILED DESCRIPTION OF THE INVENTION

Figure 1:
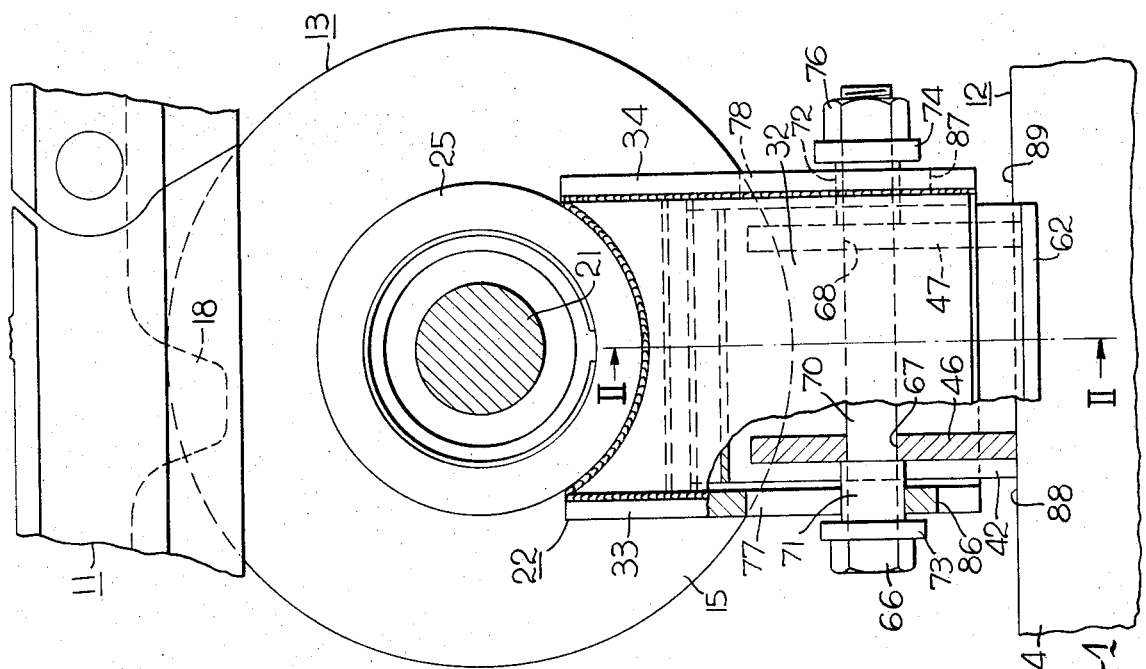
FIG. 1 shows a side view of the shock mounted carrier roller of the present invention.
Figure 2:
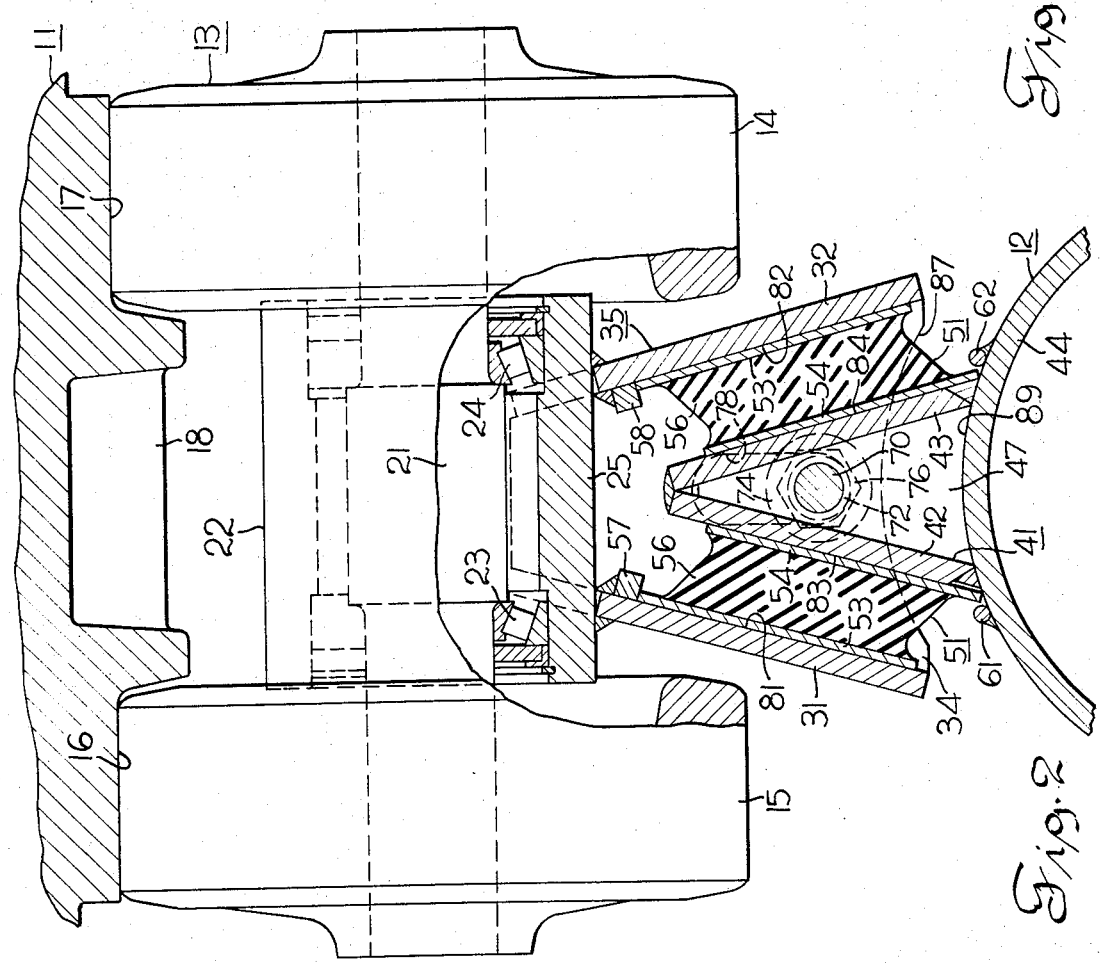
FIG. 2 is a section view taken along the line II—II in FIG. 1.

Referring to FIGS. 1 and 2, an endless track 11 is supported on a track frame 12 by idler, sprocket and track rollers (not shown) and also by a carrier roller 13. The wheels 14, 15 of the carrier roller 13 support the underside of the track as it moves in the upper portion of its endless eliptical loop. It is for this reason that this type roller is also referred to as a track support roller. The track 11 may be of any suitable construction. The particular track illustrated is made up of links, each of which includes a sprocket engaging drive lug 18 and roller engaging rail portions 16, 17 with which wheels 14, 15 of the carrier roller 13 engage. The wheels 14 and 15 are nonrotatably secured to a shaft 21 which is rotatably supported in a sleeve 25 of a housing structure 22 by a pair of antifriction bearings 23, 24. The housing structure 22 includes an open bottom box defined by wall means in the form of a pair of downwardly diverging plates 31, 32 welded to the sleeve 25 and end plates 33, 34 welded to plates 31, 32 and to sleeve 25.

The track frame 12 includes an upstanding V-shaped support structure 41 formed by a pair of upwardly converging plates 42, 43 welded at their lower ends to a curved part 44 of the track frame 12 and welded to one another at their upper ends. The converging plates 42, 43 are reinforced adjacent their opposite ends by a pair of V-shaped upstanding plates 46, 47. A pair of elastomer pads 51 are disposed between plates 42, 43 of structure 41 and the downwardly diverging plates 31, 32. Each of the elastomer pads 51 have metal plates 53, 54 which are parallel to one another and to which a layer 56 of elastomer is bonded by suitable means so as to form a sandwich construction. Longitudinally extending abutments 57, 58 are secured as by welding to the downwardly diverging plates 31, 32, respectively. These abutments serve to limit the upward movement of plates 53 of the elastomer pads 51. Longitudinally extending rods 61, 62 are secured as by welding to the curved part 44 of the track frame 12 so as to limit downward movement of the plates 54 of the elastomer pads 51.

As illustrated, the roller 13 is in the uppermost position permitted by a preloaded bar in the form of bolt 66. In the illustrated condition the pads 51 are under a preload approximating the weight of the track and carrier roller assembly thereon. The housing structure 22 with its downwardly opening boxlike portion 35 formed by the diverging walls 31, 32 and end walls or plates 33, 34 is held in assembled relation with the V-shaped support structure 41 of the truck frame 12 by a preload bar or bolt 66 having a shank 70 extending through bores 67, 68 in plate 46, 47. A pair of cylindrical spacers 71, 72 are disposed intermediate the walls 46, 47 and washers 73, 74 on the bolt shank 70. The bolt 66 and spacers 71, 72 are held in assembled relation on the support structure 41 by a nut 76. The cylindrical sleeves 71, 72 cooperatively engage opposite lateral sides of elongated openings or slots 77, 78 formed in the vertical plates 33, 34 to thus guide vertical movement of the roller assembly 13. When the track belt 11 oscillates vertically during operation of the crawler tractor on which employed, the roller assembly 13 will move downwardly against the elastomer pads 51, which are in compression and shear. Such downward movement is permitted by the lost motion connection formed by preload bar or bolt 66 and slots 77, 78 in plates 33, 34. As shown in FIG. 1, the elastomer pads 51 are coextensive in longitudinal dimension with converging support walls or plates 42, 43.

In summary, the walls 31, 32 of housing structure 22 present a pair of downwardly diverging bearing surfaces 81, 82 in spaced, confronting relation to upwardly diverging bearing faces 83, 84 on walls 42, 43 of support structure 41 and elastomer pads 51 are disposed in thrust transmitting engagement with said surfaces 81, 82 and faces 83, 84. The preload bar 66 keeps the elastomer pads 51 in a compressed, preload condition and cooperates with slots 77, 78 to provide a lost motion connection between the structures 22, 41. Downward movement of the roller assembly 13 is limited by engagement of cylindrical abutment surfaces 86, 87 on the housing structure 22 with cylindrical abutment surfaces 88, 89 on the track frame 12.

OPERATION

As the links of the track ride over the carrier roller wheels 14, 15, the roller assembly is subjected to an impact as each link engages the roller. Also during movement of the crawler tractor the links of the track belt oscillate to provide a ripple effect in the track shape. This produces uneven vertical loading on the carrier roller assembly. The variations in vertical loading on the roller assembly are cushioned by the elastomer pads 51 which defect under compression and shear loading. This provides a continual vertical movement of the roller assembly during tractor operation which serves to prevent the build-up of mud between the roller and track frame. As heretofore mentioned, such buid-up of mud in prior tractor constructions has caused the roller to stop rotating, which results in flat spots being worn in the roller as the track belt slides over the stationary support roller. The cushioned support arrangement of this invention markedly reduces noise by allowing the roller wheels to move up and down to thereby stay in rolling contact with the track as the track undulates in moving over the roller assembly. The elastomer pads reduce the shock load on the carrier roller bearings 23, 24 thereby substantially prolonging their useful life. The resilient mounting of this invention dampens vibrations which would otherwise be transmitted to the main frame of the crawler tractor. A tractor equipped with the cushioned roller assembly is quieter operating and more comfortable to operate. The various parts of the tractor are subjected to less vibration induced fatigue failure, thus prolonging tractor life and reducing repair expenses.

The embodiments of the invention in which an exclusive property or privilege is claimed are defined as follows:

1. In a vehicle of the type having a track frame supporting an endless track, the combination comprising:
   a carrier roller assembly including
      a housing structure having
         a sleeve portion, and an open bottom box portion rigidly secured at its upper end to said sleeve portion including
            a pair of side walls extending downwardly and presenting a pair of downwardly diverging bearing surfaces and
            a pair of spaced upright end walls rigidly secured to and interconnecting opposite ends of said side walls, and
         a roller wheel mounted on said sleeve portion of said housing structure for rotation about a transverse axis and disposed in track carrying relation to said endless track,
      a support structure on said track frame extending upwardly and presenting upwardly diverging bearing faces in spaced, complementary confronting relation to said bearing surfaces, and
      elastomer pad means disposed between and having opposite sides in thrust transmitting engagement with said surfaces and faces, respectively.

2. The invention of claim 1 and further comprising a preload bar in cooperative engagement with said structures and maintaining said pad means in a predetermined preload condition.

3. The invention of claim 2 wherein said preload bar is secured to one of said structures and has a lost motion connection with the other of said structures.

4. The invention of claim 1 and further comprising releasable fastening means in cooperative engagement with said structures whereby said structures and pad means are maintained in operative assembly, said fastening means permitting predetermined downward movement of said housing structure relative to said support structure.

* * * * *